United States Patent
Hungerford, Jr. et al.

(10) Patent No.: US 10,882,126 B2
(45) Date of Patent: Jan. 5, 2021

(54) TAKE-UP AND PAYOFF SYSTEM FOR VERTICAL PROFILING CUTTING SAW (VPX)

(71) Applicant: ESCO Group, Inc., Grand Rapids, MI (US)

(72) Inventors: Richard A. Hungerford, Jr., Ada, MI (US); John Slott, Comstock Park, MI (US)

(73) Assignee: Esco Group, Inc., Grand Rapids, MI (US)

( * ) Notice: Subject to any disclaimer, the term of this patent is extended or adjusted under 35 U.S.C. 154(b) by 0 days.

(21) Appl. No.: 15/799,107

(22) Filed: Oct. 31, 2017

(65) Prior Publication Data

US 2018/0200811 A1   Jul. 19, 2018

Related U.S. Application Data

(60) Provisional application No. 62/446,025, filed on Jan. 13, 2017.

(51) Int. Cl.
| | |
|---|---|
| *B23D 55/08* | (2006.01) |
| *B23D 53/08* | (2006.01) |
| *B23D 55/06* | (2006.01) |
| *B23D 55/04* | (2006.01) |
| *B23D 53/02* | (2006.01) |

(52) U.S. Cl.
CPC ......... *B23D 55/082* (2013.01); *B23D 53/02* (2013.01); *B23D 53/08* (2013.01); *B23D 55/043* (2013.01); *B23D 55/06* (2013.01); *B23D 55/046* (2013.01)

(58) Field of Classification Search
CPC ...... B23D 53/02; B23D 53/08; B23D 55/043; B23D 55/046; B23D 55/06; B23D 55/082
USPC .......................................................... 83/809
See application file for complete search history.

(56) References Cited

U.S. PATENT DOCUMENTS

| | | | | |
|---|---|---|---|---|
| 1,453,335 A | * | 5/1923 | Bennett ................. | B23D 53/12 30/380 |
| 2,415,877 A | * | 2/1947 | Hajek .................. | B23D 53/003 83/745 |
| 2,604,910 A | * | 7/1952 | Crosby ................. | B23D 55/06 30/380 |
| 2,727,944 A | * | 12/1955 | Howard ................. | H04L 17/26 178/35 |
| 2,815,775 A | * | 12/1957 | Holt .......................... | B27C 9/04 83/810 |
| 2,903,027 A | * | 9/1959 | Edgemond, Jr. ........ | B27B 13/10 83/817 |
| 2,995,160 A | * | 8/1961 | Edgemond, Jr. ....... | B23D 55/06 83/802 |
| 3,217,473 A | * | 11/1965 | Lawrie ................... | A01D 57/20 56/14.4 |
| 3,362,495 A | * | 1/1968 | Lacey ..................... | B60V 1/02 180/117 |

(Continued)

*Primary Examiner* — Ghassem Alie
(74) *Attorney, Agent, or Firm* — Frank M. Scutch, III

(57) ABSTRACT

A profiling saw with band knife loop take-up and payoff compensation includes an endless circulating band knife which is guided around a plurality of band knife pulleys so the take-up and payoff adjustment is provided of the loop circulation path shape. The take-up and payoff system operates to move a pulley in the vertical plane for allowing the band knife to maintain its cutting orientation during movement and providing for more rapid and precision cuts into a workpiece.

7 Claims, 5 Drawing Sheets

(56) References Cited

U.S. PATENT DOCUMENTS

| | | | | |
|---|---|---|---|---|
| 3,800,650 A | * | 4/1974 | Schroder | B23D 53/04 83/789 |
| 3,831,576 A | * | 8/1974 | Mech | B24D 99/00 125/12 |
| 3,913,436 A | * | 10/1975 | Orescan | B23D 53/06 83/409 |
| 3,942,508 A | * | 3/1976 | Shimizu | B28D 5/045 125/16.01 |
| 3,954,037 A | * | 5/1976 | Rios | B23D 53/04 83/794 |
| 3,979,984 A | * | 9/1976 | Daniels | B23D 55/082 83/410 |
| 4,048,892 A | * | 9/1977 | Yamashita | B23D 55/06 83/799 |
| 4,111,085 A | * | 9/1978 | Johnson | B23D 53/04 83/801 |
| 4,193,192 A | * | 3/1980 | Cortez | B23D 53/12 30/380 |
| 4,289,180 A | * | 9/1981 | Weinzierl | B27B 1/00 144/378 |
| 4,307,641 A | * | 12/1981 | Shapleigh | B27B 17/005 83/495 |
| 4,433,589 A | * | 2/1984 | Chaconas | B23D 55/06 74/325 |
| 4,494,523 A | * | 1/1985 | Wells | B28D 5/045 125/16.01 |
| H45 H | * | 4/1986 | Gilmore | 30/392 |
| 4,683,791 A | * | 8/1987 | Demont | B26D 5/22 83/16 |
| 4,903,682 A | * | 2/1990 | Kurokawa | B23D 57/0061 125/16.01 |
| 4,915,000 A | * | 4/1990 | MacFarlane | B23D 57/0007 125/21 |
| 5,050,472 A | * | 9/1991 | Potzsch | B23D 49/007 83/424 |
| 5,052,366 A | * | 10/1991 | Matsukura | B23D 57/0061 125/16.01 |
| 5,220,729 A | * | 6/1993 | Gallant | B23D 57/0015 125/21 |
| 5,305,673 A | * | 4/1994 | Costley | B23D 53/005 474/114 |
| 5,388,334 A | * | 2/1995 | Halsey | B23D 53/08 30/123 |
| 5,564,409 A | * | 10/1996 | Bonzo | B28D 5/0058 125/12 |
| 5,813,307 A | * | 9/1998 | Richmond | B23D 55/023 83/788 |
| 6,095,129 A | * | 8/2000 | Kanemichi | B23D 57/0069 125/16.02 |
| 6,196,104 B1 | * | 3/2001 | Cloud | B23D 53/026 451/451 |
| 6,199,468 B1 | * | 3/2001 | Hackbarth | B26D 1/46 451/182 |
| 6,234,159 B1 | * | 5/2001 | Egglhuber | B23D 57/0023 125/16.01 |
| 6,386,083 B1 | * | 5/2002 | Hwang | B26F 1/3833 83/651.1 |
| 6,401,346 B1 | * | 6/2002 | Roberts | B23D 53/12 30/380 |
| 6,832,538 B1 | * | 12/2004 | Hwang | B26D 1/46 83/651.1 |
| 6,868,765 B2 | * | 3/2005 | Poetzsch | B26D 3/006 83/174 |
| 7,077,041 B2 | * | 7/2006 | Kunkel | B23D 55/082 83/34 |
| 7,276,003 B2 | * | 10/2007 | Liao | B23D 55/06 474/39 |
| 7,344,017 B1 | * | 3/2008 | Taguchi | B23Q 1/626 198/468.01 |
| 7,621,704 B2 | | 11/2009 | Schmitt et al. | |
| 7,670,270 B2 | * | 3/2010 | Alessandri | A63B 21/154 482/102 |
| 7,712,494 B2 | * | 5/2010 | Janzen | B27B 5/00 144/3.1 |
| 7,770,575 B2 | * | 8/2010 | Brocco | B23D 57/0023 125/21 |
| 7,922,424 B2 | * | 4/2011 | Clark, II | B23D 57/0007 405/156 |
| 8,109,693 B1 | * | 2/2012 | Clark, II | B23D 57/0007 405/156 |
| 8,465,227 B1 | * | 6/2013 | Clark, II | B23D 57/0007 405/156 |
| 8,475,081 B2 | * | 7/2013 | Clark, II | B63B 35/03 405/156 |
| 8,650,999 B2 | | 2/2014 | Tillman et al. | |
| 8,651,098 B2 | * | 2/2014 | Shae | B23D 57/0007 125/21 |
| 8,833,358 B1 | * | 9/2014 | Robinson, III | B28D 1/08 125/16.02 |
| 9,028,172 B2 | * | 5/2015 | Clark, II | B63B 35/03 405/156 |
| 9,283,688 B2 | | 3/2016 | Tillmann et al. | |
| 9,561,553 B2 | * | 2/2017 | Waida, Jr. | B23D 53/001 |
| 9,776,265 B2 | * | 10/2017 | Harper | B23D 57/0092 |
| 9,821,388 B2 | * | 11/2017 | Seto | B23D 53/04 |
| 9,878,381 B2 | * | 1/2018 | Sakai | B23D 55/04 |
| 10,046,405 B2 | * | 8/2018 | Ramfjord | B63C 11/52 |
| 10,131,067 B2 | * | 11/2018 | Munteanu | B26D 3/006 |
| 10,226,828 B2 | * | 3/2019 | Weimer | B23D 59/001 |
| 10,316,943 B2 | * | 6/2019 | Motsanos | B66D 3/08 |
| 2005/0252355 A1 | * | 11/2005 | Liao | B23D 55/10 83/816 |
| 2007/0252425 A1 | * | 11/2007 | Radkevich | B23D 57/0061 299/35 |
| 2007/0267006 A1 | * | 11/2007 | Ogyu | B28D 1/08 125/21 |
| 2008/0276775 A1 | * | 11/2008 | Hewitt | B23D 53/045 83/56 |
| 2012/0174723 A1 | * | 7/2012 | Matteucci | B23D 57/0007 83/794 |
| 2014/0251108 A1 | * | 9/2014 | Tillmann | B26D 1/54 83/820 |
| 2019/0176252 A1 | * | 6/2019 | Ramfjord | B23D 57/0007 |

* cited by examiner

TAKE-UP AND PAYOFF SYSTEM FOR VERTICAL PROFILING CUTTING SAW (VPX)

FIELD OF THE INVENTION

The present invention relates generally to a contour cutting machine for the cutting of objects, such as e.g. blocks made from non-woven materials such as foamed plastic, fiber batting, wadding, synthetic material, rubber or cork using a rotating endless band knife.

BACKGROUND

Contour cutting type machines are known in the art. These machines include a table for receiving the workpiece material such as a foam block. A support is configured with the table for vertical movement of a band knife or cutting wire relative to the table. On the support, vertically movable carriages are arranged to both sides of the table. An endless band knife is arranged to rotate around a plurality of band knife pulleys, such that one band knife pulley is located on one of the movable carriages while the remainder of the band knife pulleys are fixed to the machine. The band knife is guided in a closed loop, with a first portion of the loop arranged between the two vertically adjustable band knife pulleys while forming a cutting strand in this region. A problem with prior art machines is the speed and precision movements of the band knife using this type of arrangement.

SUMMARY OF THE INVENTION

A profiling bandsaw includes a circulating endless band knife forming a loop and guided around a plurality of band knife pulleys such that at least three of the band knife pulleys are fixed and at least three of the band knife pulleys are substantially simultaneously displaceable such that one of the fixed pulleys and one of the displaceable pulleys form a blade take-up and payoff adjustment system. In the take-up and payoff adjustment system at least one displaceable pulley moves in a vertical plane to compensate for changes in the overall shape and/or area of loop circulation path when the position of the band knife moves across a horizontal plane.

Still other embodiments of the invention include a vertical profiling bandsaw (VPX) that that includes a band knife configured into a loop. An upper actuator guide positioned horizontally above a lower actuator guide and a blade guide actuator is positioned horizontally between the upper actuator guide and a lower actuator guide supports a span of the band knife. A take-up and payoff actuator is positioned vertically between the upper actuator guide and lower actuator guide for adjusting the shape of the circulation path loop; and wherein the loop is configured to move along six pulleys where three of the pulleys are in a fixed position and three of the pulleys move in a manner allowing the band knife to be selectively positioned horizontally along the blade guide actuator.

Still further embodiments of the invention include a method for configuring a vertical profiling bandsaw (VPX) and comprises the steps of: circulating an endless band knife guided around a plurality of band knife pulleys to form a loop such that at least three of the band knife pulleys are fixed pulleys that are fixed in position and at least three of the band knife pulleys are displaceable pulleys that are simultaneously displaceable in position. A blade take-up and payoff adjustment system is forming using one of the fixed pulleys and one of the displaceable pulleys where the at least one displaceable pulley is typically moved in a vertical plane to compensate for excess circulation path area in the loop when the vertical orientation of the band knife's cutting area moves across a horizontal plane.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
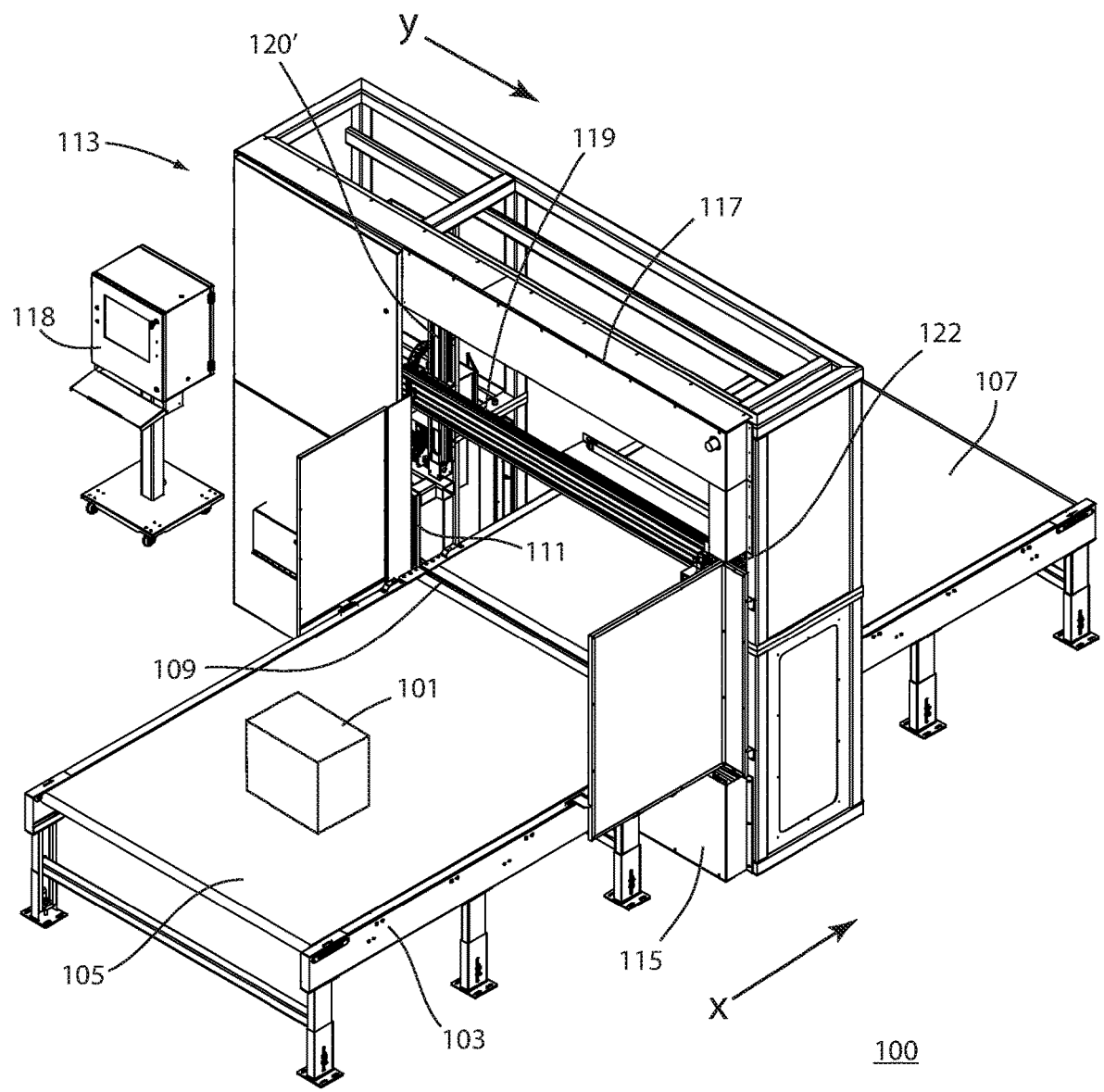
FIG. 1 is a perspective view of a profiling saw with blade take-up and payoff compensation according to an embodiment of the invention.

Before describing in detail embodiments that are in accordance with the present invention, it should be observed that the embodiments reside primarily in combinations of method steps and apparatus components related to vertical profiling bandsaw. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
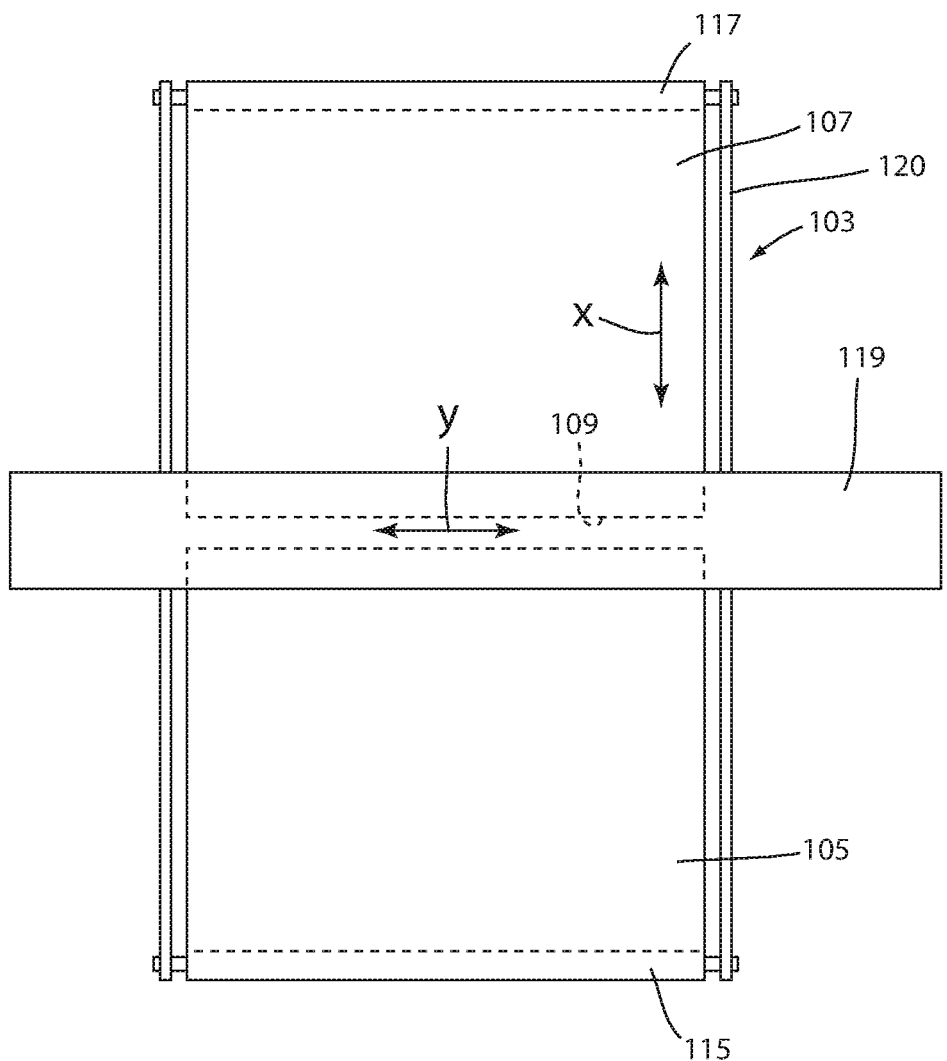
FIG. 2 is a plan view of the cutting saw as seen in FIG. 1.

FIG. 1 is a perspective view of a vertical profiling cutting saw (VPX) using band knife take-up and payoff adjustment compensation according to various embodiments of the invention. Although illustrated vertically, those skilled in the art will recognize the cutting saw may be configured with the band knife oriented in a vertical or horizontal direction relative to the ground. Those skilled in the art will further recognize the band knife may include but is not limited to a continuous looped flat metallic blade, cutting wire or the like that may be separated, spliced and reconnected. The band knife may include cutting teeth oriented on one or both sides of the band knife. FIG. 2 is a plan view of the profiling saw as seen in FIG. 1. With regard to both FIG. 1 and FIG. 2, the VPX 100 operates to provide precision cuts to a foam block 101 but also may configured to be used with other higher density materials such as stone or concrete. The block 101 is placed onto a workpiece carrier 103 comprising two conveyor belts 105,107 which are arranged in a common plane and can be driven in synchronism with each other. Both conveyor belts 105,107 both work to perform a conveying type motion in the direction X. Between the successive conveyor belts 105,107, a gap 109 is formed for the passage of the band knife 111. The two conveyor belts 105,107 are driven by a common motor positioned within the workpiece carrier 103. In use, the block 101 is driven toward the band knife 111 by conveyor belt 105 and then pulled away from the band knife 111 by conveyor belt 107 when the cut is complete.

The workpiece carrier 103 is encompassed by a frame 113 fixed to the machine and comprising a lower actuator 115 arranged below workpiece carrier 103 and an upper blade actuator 117 arranged in parallel to a lower blade actuator 115. Along each actuator, a moveable carriage is arranged to displace a pulley horizontally i.e. in the Y-direction. The two actuators are driven in synchronism with each other, thus assuming always the same positions of the displaceable pulley in the Y-direction. A middle blade guide actuator 119 is positioned between the upper blade actuator 117 and lower blade actuator 115 and works to support the span of the band knife 111. The middle blade guide actuator 119 moves in a vertical plane using elevating actuators 120,122. As described herein, the position of each pulley on each actuator, the blade location and speed are each controlled using operator terminal 118.

Figure 3A:
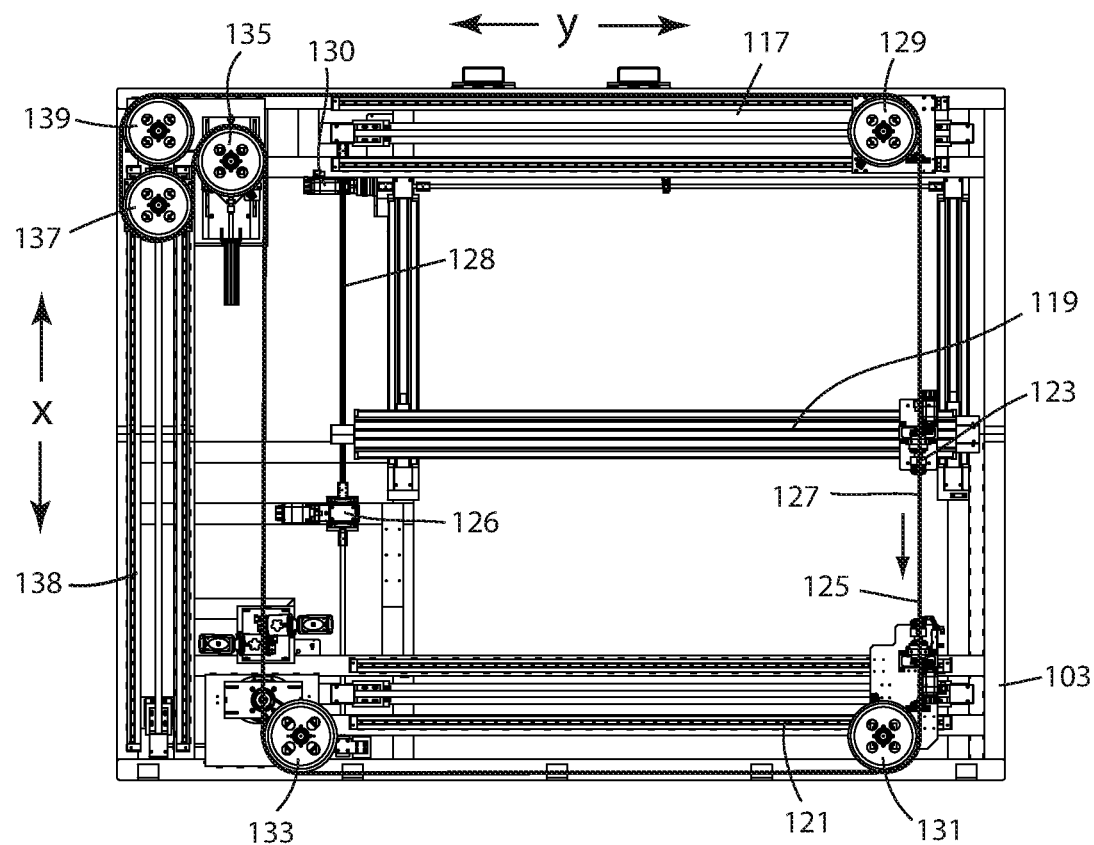
FIG. 3A is a front view of the cutting saw in a first cutting positon according to an embodiment of the invention.
Figure 3B:
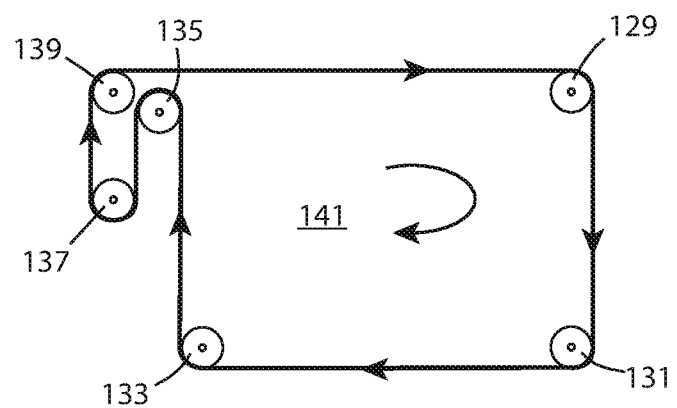
FIG. 3B is a schematic view of the moving path of the band knife in as seen in FIG. 3A.

FIG. 3A is a front view of the VPX in a first or maximum loop configuration or size according to an embodiment of the invention. FIG. 3B is a schematic view of the moving path of the band knife in as seen in FIG. 3A. With regard to both FIG. 3A and FIG. 3B, each of the actuators 117,121 move in a coordinated manner with a band knife positioning device 123. The band knife positioning device 123 moves along the middle blade guide actuator 119. The band knife positioning device 123 includes a slot for passing the band knife 125 therethrough and acts to guide the band knife 125 to precise locations for achieving precision cutting of the work piece. The band knife positioning device 123 also controls the band knife 125 in such a manner that the face of band knife 125 in the cutting strand 127 can be adjusted to a desired cutting angle, e.g. to the tangent angle of the cutting contour to be generated.

As described herein, an embodiment of the invention uses six pulleys to control position of the band knife 125. Those skilled in the art will recognize that a pulley is wheel with a grooved rim around which the band knife 125 will pass. The pulley acts to change the direction of a force applied to the band knife 125 so the band knife runs in a continuous loop. As seen in FIG. 1, a first band knife pulley 129 moves its position in the y axis i.e. such that it is movable or "displaceable" and is supported on the upper blade actuator 117, while a second band knife pulley 131 is also displaceable and supported on the lower blade actuator 121. From first band knife pulley 129, the band knife 125 extends to the second band knife pulley 131 which is supported on the work tool carrier 103 and driven by a motor 126. Those skilled in the art will recognize the motor 126 operates a drive train system having both a plurality of spline shafts 128 and a plurality of gear boxes 130. In view of the unique driving arrangement, a single motor provides movement to both the actuators and band knife in the VPX.

The first band knife pulley 129 and second band knife pulley 131 are aligned and synchronized in movement so to maintain the band knife 125 in a vertical position relative to the surface of conveyers. A third band knife pulley 133 is fixed in position and is oriented at the same height as second band knife pulley 131. The third band knife pulley 133 extends substantially horizontally from the band knife pulley 131 and is also supported on work tool carrier 103. From the third band knife pulley 133, the band knife 125 extends above the third band knife pulley 133 to a fourth band knife pulley 135 that is also substantially fixed in position. The fourth band knife pulley 135, sometimes called the tensioner pulley, is configured below the upper blade guide actuator 117 and can move slightly enabling it to control overall blade tension. Those skilled in the art will recognize that the band knife 125 folds back on itself at the fourth band knife pulley 135 so that the opposite surface of the band knife 125 contacts the pulley. The band knife 125 then extends diagonally to a fifth band knife pulley 137 that is also displaceable. The band knife 125 then extends to a sixth band knife pulley 139 that is fixed where the band knife 125 extends back to the first band knife pulley 129 forming a closed loop. A novel aspect to the invention is that the fifth band knife pulley 137 and the sixth band knife pulley 139 form a take-up and payoff system allowing the shape and/or internal area of the band knife 125 to be adjusted and/or compensated when the actuators 117, 119, 121 and band knife 125 are moved in the y direction. The term "take-up" refers to reducing the loop circulating path of the band knife 125 while the term "payoff" refers to expanding the loop circulation path. Although the band knife 125 bends in multiple directions during this process, including back upon itself at the fourth pulley 135, the material composition selected for the band knife 125 works to allow the band knife 125 to easily flex in a 180-degree arc. This allows the band knife cutting position to be quickly adjusted while also keeping the band knife circulation loop taut by compensating its shape to accommodate for excess blade area at one end of the VPX 100.

FIG. 3B illustrates the moving path of the band knife 125 in a given Y-position of the cutting strand 127. In the cutting strand 127, the band knife 125 is moved downwardly from the first band knife pulley 129 in the direction of the arrow. The band knife 125 with its cutting strand 127 form a first rectangular loop 141. Hence, the closed and continuous loop 141 of the band knife 125 starts at the first band knife pulley 129, extending to second band knife pulley 131, third band knife pulley 133, fourth band knife pulley 135, fifth band knife pulley 137 and sixth band knife pulley 139.

Figure 4A:
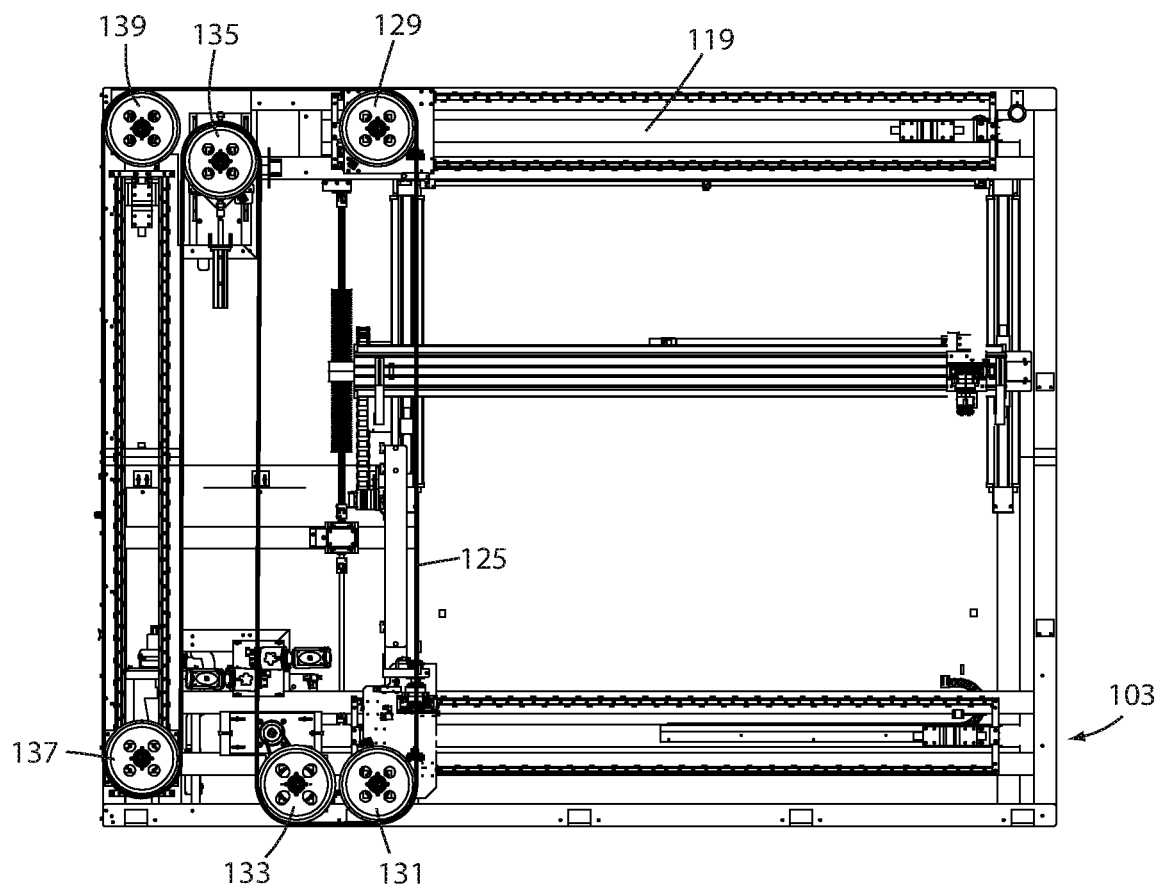
FIG. 4A is a front view of the cutting saw in a second cutting position according to an embodiment of the invention.
Figure 4B:
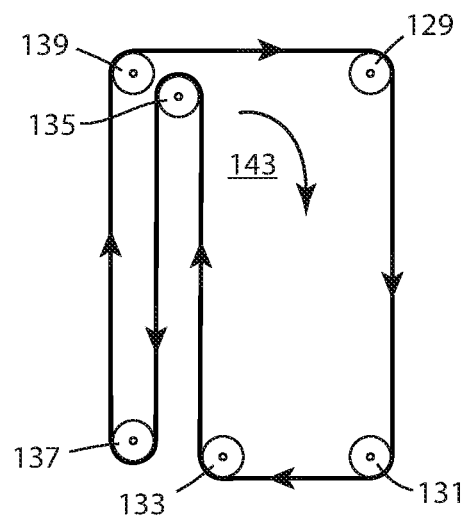
FIG. 4B is a schematic view of the moving path of the band as seen in FIG. 4A.

FIG. 4A is a front view of the profiling cutting saw in a second or minimum loop size according to an embodiment of the invention while FIG. 4B is a schematic view of the moving path of the band knife 125 as seen in FIG. 4A. With regard to both FIG. 4A and FIG. 4B, those skilled in the art will recognize that each band knife pulley 129, 131, 133, 135, 137 and 139 is formed with an outwardly curved peripheral surface to keep the band knife 125 from sliding off the band knife pulleys. Preferably, the peripheral surface is part of a spherical surface where the band knife pulley can be configured using a cut-out or slice from a spherical body.

Thus, the band knife 125 operates in a closed loop circulation path. Those skilled in the art will recognize that when the cutting position of the band knife 125 is changed in the y-direction, the length of the circulation path will still remain constant. Depending on blade position, excess circulating area i.e. the shape of the band knife 125 loop is adjusted using the fifth band knife pulley 137 such that pulley 137 typically moves in an x-direction i.e. in substantially vertical direction.

In use, when the band knife 125 is moved toward the sixth band knife pulley 129, the firth band knife pully will move downwardly toward the floor where, the take-up and pay-off actuator 138 works to take up the excess loop area in the band knife 125. This movement operates in a synchronous manner to keep the band knife 125 circulation path substantially taut. Similarly, when the band knife 125 is moved in the opposite direction way from the sixth band knife pulley 139, the take-up and payoff actuator 138 will move upwardly to adjust circulation path area and shape of the loop. The third pulley 133, fourth pulley 135 and sixth pully 139 are substantially fixed. while the first band knife pulley 129, second band knife pulley 131 and fifth band knife pulley 137 are simultaneously displaceable. Hence, the fifth band knife pulley 137 moves with the take-up and pay off actuator 138 positioned vertically within the frame of the VPX 100 depending on a required position of the band knife 125. The movement of the take-up and pay off actuator 138 is electronically controlled using a computer and/or microprocessor in operator terminal 118. Since the band knife 125 moves with the fifth band knife pulley 137, this movement is in coordination with the band knife cutting position and works to adjust the band knife loop for excess area in the blade circulation loop.

As seen in FIG. 4B, the take-up and payoff shape compensating system is controlled using the fifth band knife pulley 137 and sixth band knife pulley 139. As the band knife 125 is moved in the y-direction, the fifth band knife pulley 137 moves vertically. While moving either in an upward or downward motion, the band knife 125 circulation path is altered to form a second loop 143. Although the band knife 125 remains the same length, the fifth band knife pulley 137 can easily be positioned to allow the band knife 125 to stay in any operating position across the work tool carrier 103 in the y-direction. Hence, the first band knife pulley 129, second band knife pulley 131, third band knife pulley 133, and sixth band knife pulley 139 are generally arranged in a configuration of a rectangle and the fourth band knife pulley 135, and fifth band knife pulley 137 form a take-up and payoff compensation system for controlling the excess area created by the loop shape of the circulating band knife 125. Using a six-pulley configuration as described herein, the take-up and payoff compensation system allows the circulation path shape and circulation path area of the band knife loop to be easily adjusted keeping the circulating path taut to provide precision cuts to a workpiece.

Figure 5:
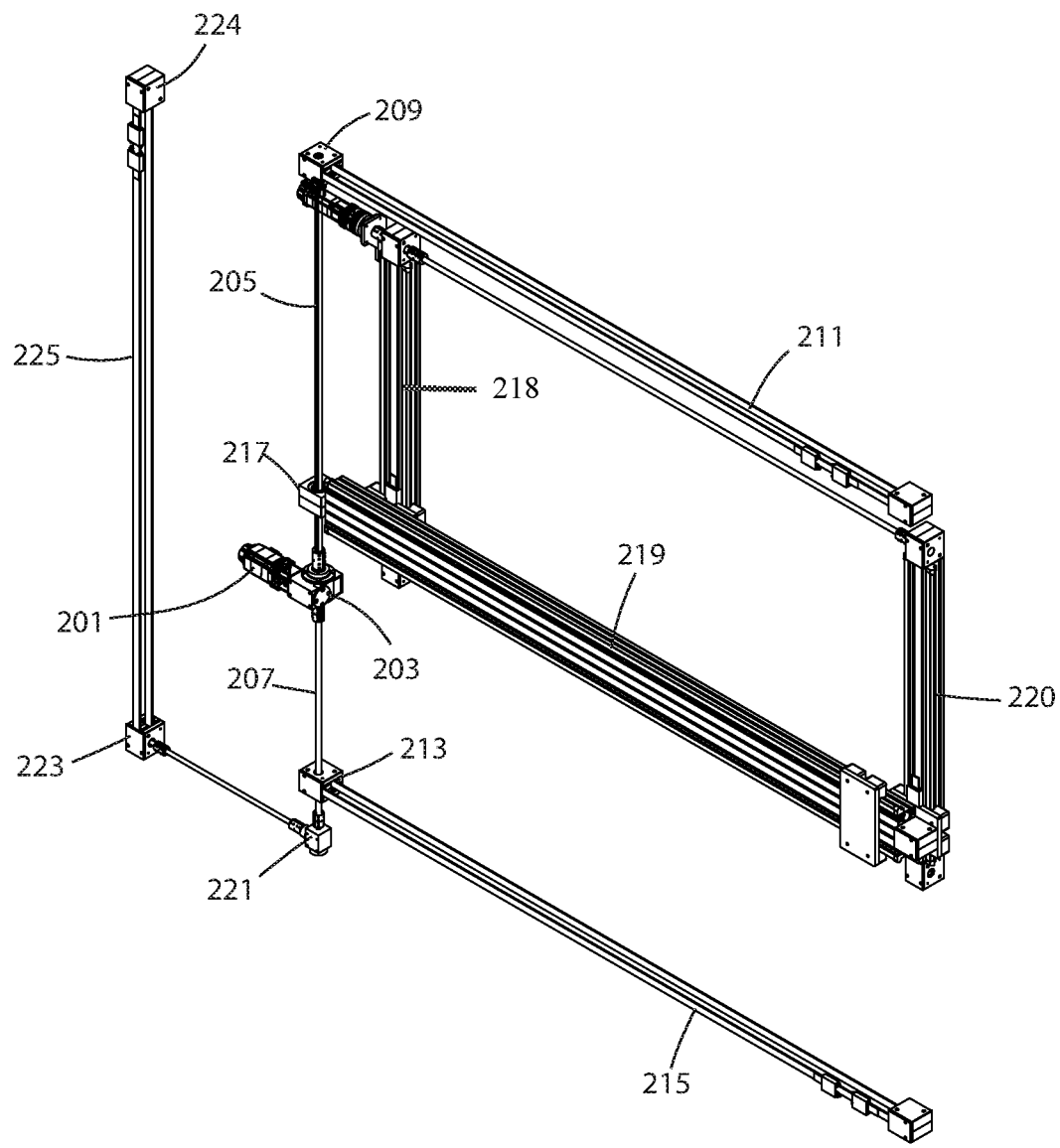
FIG. 5 is perspective view of the cutting saw illustrating its drive mechanism for controlling actuator and blade movement.

FIG. 5 is a front view of the cutting saw illustrating the drive mechanism used to drive and/or move the blade and actuators. The drive mechanism 200 for the VPX 100 uses a single motor 201 to provide the drive power for the band knife 125 and actuators. Although the motor 201 is typically electrical it may be powered by other means as well such gas or petroleum based products. The drive mechanism 200 includes a gear box 203 that translates rotational movement of the motor 201 to both an upper spine shaft 205 and a lower spline shaft 207. The upper spline shaft 205 rotates a gear box 209 for providing drive power to move a pulley on the upper blade actuator 211. Similarly, the lower shaft 207 rotates a gear box 213 to provide drive and movement to a pulley on the lower blade actuator 215. Additionally, the upper spline shaft 205 also rotates gear box 217 that works to control movement of the blade knife 125 along blade guide actuator 219. Those skilled in the art will also recognize that the gear box 217 controls vertical movement of the blade guide actuator 219 along guides 218, 220. Further, the lower spline shaft 207 also rotates gear box 221 that in-turn rotates gear box 223. The gear box 223, 224 operate to control the position of a pulley that is part of the take-up and payoff actuator 225. As described herein, the take-up and payoff actuator 225 controls the shape of the band knife loop to keep the band knife 125 circulating path taut regardless of its position across the work table. As described herein, each gear box may also drive one or more of the six pulleys used in the system that controls blade movement and speed.

Thus, the present invention is directed to a machine and method for a profiling bandsaw that uses a circulating, endless band knife that forms a loop and is guided around a plurality of band knife pulleys. At least three of the band knife pulleys are fixed in position while the remaining three of the band knife pulleys are substantially simultaneously displaceable and/or moveable to adjust shape of the band knife circulation area depending on position. According to various embodiments of the invention. one of the fixed pulleys and one of the displaceable pulleys form a blade take-up and payoff adjustment system such that at least one displaceable pulley moves in a vertical plane to compensate for changes in loop circulation path shape when the position of the band knife moves using a carriage across a horizontal plane.

Although a preferred embodiment of the invention has been specifically illustrated and described herein, it is to be understood that minor variations may be made in the apparatus without departing from the spirit and scope of the invention, as defined the appended claims. One of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A vertical profiling bandsaw (VPX) comprising:
a band knife configured into a loop;
an upper actuator positioned horizontally above a lower actuator such that the upper actuator and lower actuator allow coordinated movement of the band knife;
a blade guide actuator positioned horizontally between the upper actuator and lower actuator for supporting a span of the band knife;
a take-up and payoff actuator located adjacent to the upper actuator and lower actuator for adjusting the circulation path shape of the loop while maintaining the overall net length of a band knife perimeter; and
wherein the loop is configured to move along six pulleys where three of the pulleys are in a fixed position and three of the pulleys move in a manner allowing the band knife to be selectively positioned horizontally along the blade guide actuator such that one pulley moves in a first plane that is substantially vertical and configured parallel to the band knife cutting position extending between the upper actuator and lower actuator for providing take-up and payoff during band knife movement and two pulleys move in a second plane that is substantially orthogonal to the first plane and where the two pulleys hold the band knife in the band knife cutting position and are configured so that the band knife is positioned on the same side of each one of the two pulleys.

2. A vertical profiling handsaw (VPX) as in claim 1, wherein band knife movement and cutting position are controlled using a single motor.

3. A vertical profiling handsaw (VPX) comprising:
a band knife configured into a loop;
an upper actuator positioned horizontally above a lower actuator such that the upper actuator and lower actuator allow coordinated movement of the band knife;
a blade guide actuator positioned between the upper actuator guide and lower actuator guide for supporting a span of the band knife;
a take-up and payoff actuator located vertically between the upper actuator and lower actuator for adjusting circulation path shape of the loop while maintaining the overall net length of a band knife path perimeter where the loop is configured to move along six pulleys where three of the pulleys are in a fixed position and three of the pulleys move in a manner allowing the band knife to be selectively positioned for use with the blade guide actuator; and
wherein two of the three band knife pulleys that move are substantially simultaneously displaceable across a substantially horizontal plane to adjust the cutting position of the band knife and one of the at least three pulleys simultaneously moving in a substantially vertical plane orthogonal to the movement of the other two pulleys for use with the take-up and payoff actuator and where the two pulleys hold the band knife in the band knife cutting position and are configured so that the band knife is positioned on the same side of each one of the two pulleys.

4. A vertical profiling bandsaw (VPX) as in claim 3, wherein the upper actuator and lower actuator each include a pulley that moves along each respective actuator to control band knife position.

5. A vertical profiling bandsaw (VPX) as in claim 3, wherein band knife movement and cutting position are controlled using a single motor.

6. A vertical profiling bandsaw (VPX) comprising:
a band knife configured into a loop;
an upper actuator positioned horizontally above a lower actuator such that the upper actuator and lower actuator allow coordinated movement of the band knife in one cutting plane;
a blade guide actuator positioned horizontally between the upper actuator and lower actuator for supporting a span of the band knife used for cutting;
a take-up and payoff actuator located adjacent to the upper actuator and lower actuator for adjusting the position of the upper actuator and lower actuator while maintaining the overall net length of a band knife path perimeter; and
wherein the loop is configured to move along six pulleys where three of the pulleys are in a fixed position and three of the pulleys move in a manner allowing the band knife to be selectively positioned in a desired cutting position, such that one pulley is a take-up and payoff pulley that moves in a first plane that is substantially vertical for providing positioning of the band knife during band knife movement and two pulleys move in a second plane substantially orthogonal to the first plane for adjusting cutting position of the band knife and where the two pulleys hold the band knife in the band knife cutting position and are configured so that the band knife is positioned on the same side of each one of the two pulleys.

7. A vertical profiling bandsaw (VPX) as in claim 6, wherein band knife movement and cutting position are both controlled using a single motor.

\* \* \* \* \*